June 15, 1965  E. T. JAGGER ETAL  3,189,356

FACE SEAL

Filed March 26, 1962

3,189,356
FACE SEAL

Ernest T. Jagger and Robert W. Wallace, Newcastle upon Tyne, England, assignors to George Angus & Company Limited, Newcastle upon Tyne, England
Filed Mar. 26, 1962, Ser. No. 182,544
Claims priority, application Great Britain, Apr. 20, 1961, 14,353/61
2 Claims. (Cl. 277—42)

This invention relates to sealing devices for relatively rotatable members, such as a machine shaft and its housing, and is concerned with such devices known as face seals.

A face seal essentially comprises a sealing ring which is mounted for axial movement, usually on an annular diaphragm, and is axially spring-loaded to urge an axially-directed sealing face of the ring into intimate face contact with a radial transverse face of a relatively rotatable member to be sealed.

The sealing ring may be made of carbon, leather, hard rubber, plastics or other material suitable for providing a rubbing seal.

The resilient mounting of the sealing ring usually consists of a moulded rubber annular diaphragm by which the sealing ring is carried coaxially and which has a cylindrical wall portion, to hold the seal in a housing, and a spring or springs to load the diaphragm and sealing ring axially.

According to the present invention, a face seal comprises a flexible, resiliently stretchable sleeve, moulded from rubber or like material, a sealing ring mounted coaxially on one end of the sleeve, the wall of the sleeve being of inwardly turned, U-sectional shape around the sealing ring so as to define a U-section annulus at which rolling can occur to vary the over-all length of the sleeve and hence accommodate axial movement of the sealing ring, and a compression spring held in the sleeve to load the sealing ring axially outwardly, the moulded, unstressed, length of the sleeve being greater than its length when the seal is in working position and the sleeve being axially stretched by the spring when the seal is out of working position.

When the seal is placed in working position, its spring is axially compressed and its sleeve wall is shortened by rolling but such shortening of the sleeve wall takes place from a stretched condition through a normal, unstressed, condition, so that the final stresses in the rubber of the sleeve wall are less than if the sleeve were moulded to correspond to the uncompressed length of the spring. Consequently, the spring takes a greater proportion of the total axial load in maintaining the sealing ring against the surface which it seals and it is a relatively simple matter to provide a spring of appropriate strength as compared with providing a rubber component to withstand heavy stresses for a long period of use.

Figure 1:
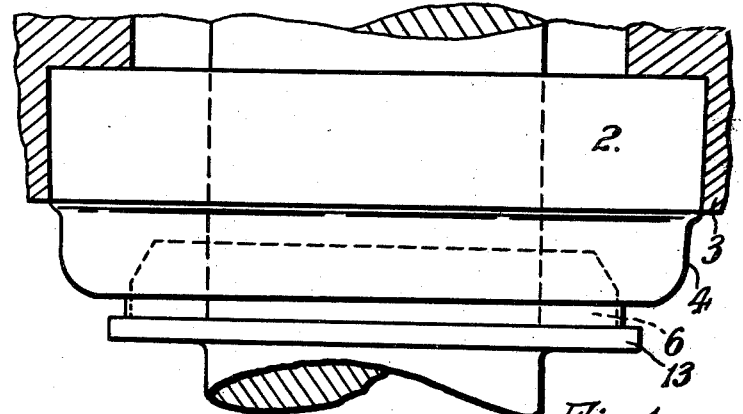
Figure 2:
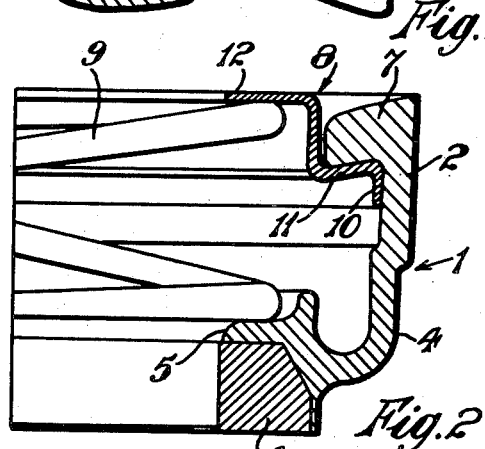
Figure 3:
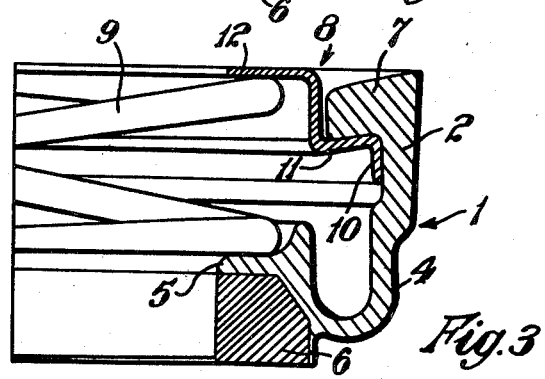

The invention will be further described with reference, by way of example, to the accompanying drawing, in which:

FIG. 1 is an elevation of a face seal, mounted in a housing and sealing against a collar on a shaft, and FIGS. 2 and 3 are radial axial sections of a face seal shown in the conditions respectively of a free state and working position.

The face seal as shown comprises a moulded rubber sleeve 1 having a relatively thick cylindrical holding portion 2, by which it can be held in a housing 3, and a thinner flexible wall 4 which is moulded to inwardly turned, U-sectional shape around an annular socket or seat end portion 5 in which is mounted a sealing ring 6, such as a carbon ring adhesively bonded in place.

The cylindrical holding portion 2 has a stout inward flange 7 which makes an acute inside angle with the bore of the sleeve to form a seat for a spring-retaining, pressed sheet metal, ring 8 which holds a helical compression spring 9, coaxially within the sleeve, against the inner side of the sealing ring seat portion 5 at the other end of the sleeve.

It can be seen that the spring-retaining ring 8 is substantially of oblique W cross-section with an outer peripheral flange 10 and frusto-conical web portion 11 seated in the inside angle of the sleeve flange 7 and an inner peripheral flange 12 providing an axial abutment for the spring 9.

The acute inside angle of the sleeve flange 7 and the matching conicity of the web portion 11 of the spring-retaining ring promote secure retention of the ring 8 in the sleeve under the axial thrust of the spring 9.

It can be seen by comparison of FIGS. 2 and 3 that the wall 4 of the sleeve 1 shortens from the free state of FIG. 2, in which the wall 4 is stretched from its normal, unstressed, moulded length, to the working position of FIG. 3 by rolling and consequent deepening of its U-sectional shape.

The moulded length of the sleeve 1 is intermediate the lengths thereof shown by FIGS. 2 and 3, being about half-way between the two. When the seal is installed in its housing 3 and axially compressed by its sealing ring bearing on a shaft collar 13, the wall 4 of the sleeve is first relieved of its stretch stresses and then subjected to rolled stresses but less than would be produced in a sleeve moulded to the axial length shown by FIG. 2.

The spring 9 is placed under appreciable compression as the retaining ring 8 is engaged behind the flange 7 when the seal is assembled and, in partially recovering, stretches the sleeve wall 4. The assembled but free state of the seal is therefore one in which the spring and sleeve are stressed and consequently the secure retention of the ring 8 by the acute-angled flange 7 is an important feature of the invention.

As is known in face seals, the spring 9 could be replaced by several smaller helical compression springs spaced around the inside of the seal.

The term "rubber" used in this specification is intended to include not only natural and synthetic rubbers but also like materials, including some of those commonly called plastics, which may be used as substitutes for rubber.

We claim:

1. A face seal comprising a moulded rubber sleeve, said sleeve having a cylindrical holding portion, an integral inward flange on said holding portion forming an acute angle with the bore thereof, a flexible cylindrical wall portion thinner than said holding portion, said wall portion extending axially from said holding portion, and an inwardly turned end portion at that end of said wall portion further from said holding portion, said inwardly turned end portion and said cylindrical wall portion defining a U-section annulus at which rolling of the sleeve can occur to vary the over-all length of said sleeve; a sealing ring mounted coaxially in said inwardly turned end portion; a retaining ring seated in said holding portion between said integral flange and said bore thereof; and a helical compression spring in said sleeve extending coaxially in compression between said sealing ring and said retaining ring and stretching said sleeve axially to a length greater than the moulded length of said sleeve.

2. A face seal comprising: a molded sleeve of flexible and resiliently stretchable material, an integral inwardly turned flange on one end of said sleeve forming an acute angle with the bore of said sleeve and constituting a seat for a compression spring retaining ring, said sleeve between said one end and the other end being substantially in the form of a thin-walled cylinder, an integral inwardly turned portion at the other end of said sleeve forming a U-section annulus with said thin-walled cylinder portion so as to permit the over-all length of said sleeve to be varied by a rolling action at said U-section annulus, means integral with said inwardly turned portion forming a seat for a sealing ring, said sealing ring seat being located substantially inwardly of said U-section annulus and coaxial with the bore of said thin-walled cylinder portion so that axial movement of said seat will effectively increase or decrease the length of the inner arm of said U-section annulus depending upon whether said seat is moved toward or away from said one end of said sleeve and thus decrease or increase the over-all length of said sleeve, a sealing ring mounted coaxially in said seat with its sealing surface facing longitudinally outwardly, a retaining ring in said compression spring retaining ring seat, and a helical compression spring in said sleeve extending in longitudinal compression between said sealing ring and said retaining ring and deforming said sleeve axially to a length greater than the molded length of said sleeve, whereby upon operatively mounting said face seal in working position said sleeve will be shortened at least partially by a rolling action at said U-section annulus so as at least to approach the normal molded length thereof.

References Cited by the Examiner

FOREIGN PATENTS

| | | |
|---|---|---|
| 963,942 | 1/50 | France. |
| 851,246 | 10/60 | Great Britain. |
| 561,465 | 4/57 | Italy. |
| 561,776 | 4/57 | Italy. |

EDWARD V. BENHAM, *Primary Examiner.*

SAMUEL ROTHBERG, *Examiner.*